United States Patent

[11] 3,585,877

| [72] | Inventors | Jordon Kass<br>Wayne;<br>John L. Evans, Oakland, both of, N.J. |
|---|---|---|
| [21] | Appl. No. | 781,213 |
| [22] | Filed | Dec. 4, 1968 |
| [45] | Patented | June 22, 1971 |
| [73] | Assignee | Singer-General Precision, Inc.<br>Little Falls, N.Y. |

[54] PHOTODYNAMIC PICKOFF SYSTEM FOR A FREE-ROTOR GYROSCOPE
5 Claims, 12 Drawing Figs.

[52] U.S. Cl. .................................................. 74/5.6, 250/214, 250/215, 340/190
[51] Int. Cl. ........................................................ G01c 19/28
[50] Field of Search ........................................... 250/203, 214, 215; 74/5.6; 340/190

[56] References Cited
UNITED STATES PATENTS

| 3,217,169 | 11/1965 | Grimmeiss et al. | 250/217 |
| 3,242,795 | 3/1966 | Hughes | 250/203 X |
| 3,277,304 | 10/1966 | Vyce | 74/5.6 X |
| 3,367,194 | 2/1968 | Diamantides | 74/5.6 |
| 3,422,686 | 1/1969 | Unruh | 74/5.6 |
| 3,430,895 | 3/1969 | Campagruolo | 137/81.5 X |
| 3,439,547 | 4/1969 | Slayter | 74/5.6 |
| 3,465,600 | 9/1969 | Riordan et al. | 74/5.6 |
| 3,470,377 | 9/1969 | LeFebre et al. | 250/203 X |

*Primary Examiner*—James W. Lawrence
*Assistant Examiner*—C. M. Leedom
*Attorneys*—S. A. Giarratana, G. B. Oujevolk and S. M. Bender

ABSTRACT: A photodynamic pickoff system for a two-axis, free-rotor gyroscope of the gas bearing type, and including a light reflecting means for reflecting an incident light beam to a photoelectric transducer means which provides two-axis positional information in the form of a pulse duration modulated output signals.

PATENTED JUN22 1971

INVENTORS
JORDAN KASS
JOHN L. EVANS

BY

S. M. Weinerstein

ATTORNEY

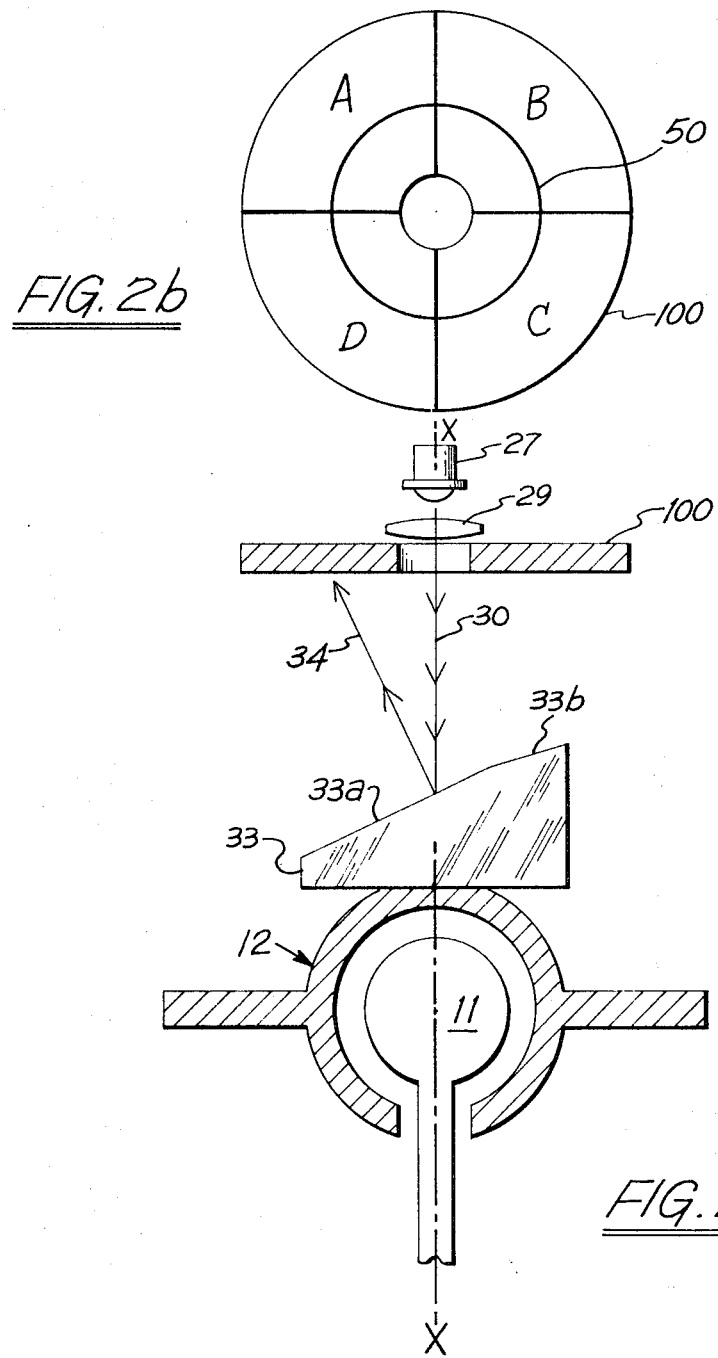

INVENTORS
JORDAN KASS
JOHN L. EVANS
BY
ATTORNEY

INVENTORS
JORDAN KASS
JOHN L. EVANS
BY
ATTORNEY

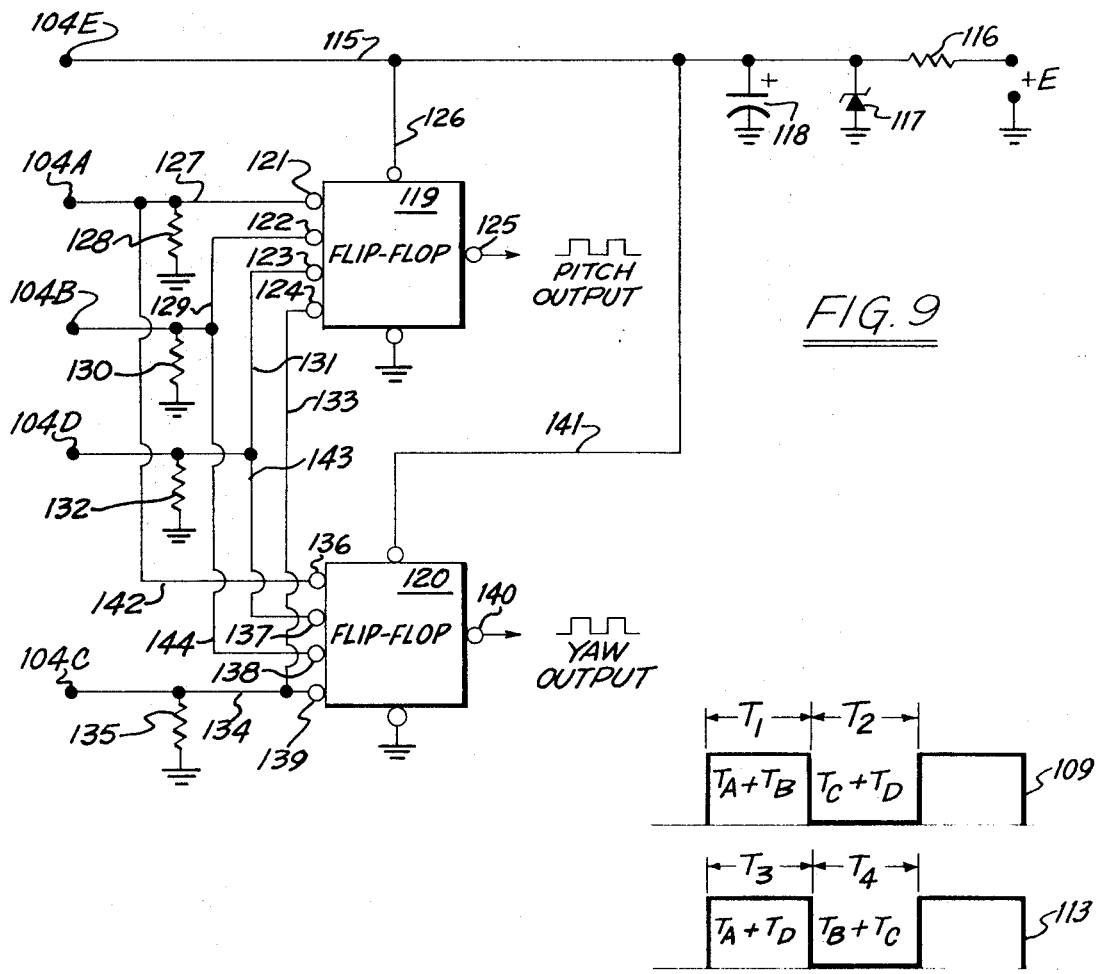
FIG. 9
FIG. 8
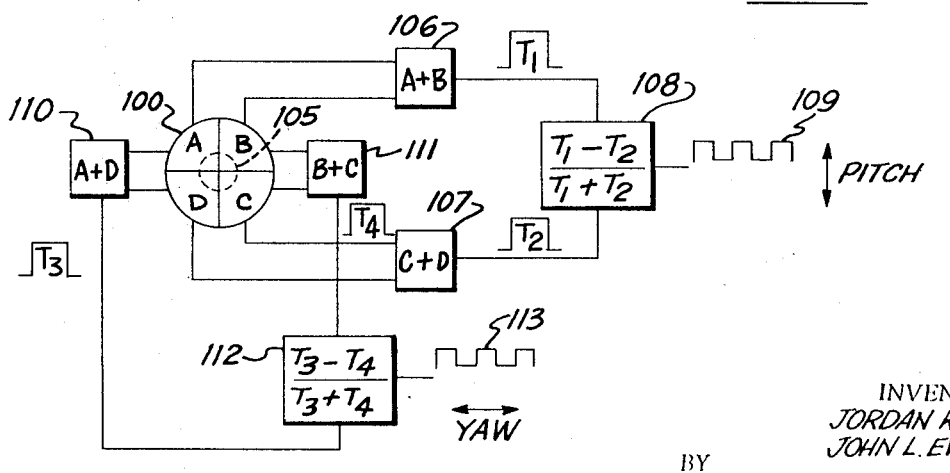
FIG. 7
INVENTORS
JORDAN KASS
JOHN L. EVANS
BY
ATTORNEY

PHOTODYNAMIC PICKOFF SYSTEM FOR A FREE-ROTOR GYROSCOPE

BACKGROUND OF THE INVENTION

This invention relates to a photodynamic pickoff system for a spatial orientation responsive device, or the like; and, more particularly, to such a system for supplying two-axis positional information in the form of output signals of the pulse duration modulated type.

Spatial orientation responsive devices, such as directional gyroscopes, rate gyroscopes, angular accelerometers, and the like, are often employed in aircraft and guided missile applications to provide output signals which represent some aspect of the attitude or motion of the vehicle in which the devices are mounted. A common form of spatial orientation responsive device utilizes a stator member which is fixed in position with respect to the vehicle in which the device is mounted and a spinning rotor member which has one or more degrees of freedom of movement. The spinning rotor member acts as a reference against which positional and motional deviations of the stator and vehicle may be measured. The angular deviations between the rotor spin axis and a stator reference axis in one or more planes, representing the degrees of freedom of the device, may then be utilized to provide directional, rate or acceleration signals depending upon the application and type of equipment involved. In order to obtain these signals, however, it is necessary to employ a pickoff system which functions to convert the positional difference between the rotor and stator members of the device into an output signal which represents the desired quantity being measured. Such a pickoff system is disclosed in copending U.S. Pat. application Ser. No. 687,860, of Sol Shapiro, et al. for "Photodynamic Pickoff Means Having A Pulse Duration Modulated Output," filed Dec. 4, 1967, and assigned to the same assignee as the present application. This system, in general, features the use of means mounted on the stator member for producing a light beam directed towards one of the spin axis poles of the rotor member, a coplanar mirror mounted on the rotor member for reflecting the light beam, light beam splitting means on the stator member for transmitting the reflected light beam towards the mirror and reflecting the reflected light beam away from its source. A photoelectric transducer is disposed to the side of the rotor-stator assembly and is offset from the "stator reference axis," which may be defined as the stator axis about which the rotor spins in a null, or centered, position. The transducer is in the path of the light beam that is reflected from the light beam splitting means, and is adapted to translate the path traced by the rotating light beam into a series of output pulses having relative pulse widths which are dependent upon the angular deviation between the rotor spin axis and the stator reference axis.

However, several problems exist in the above disclosed arrangement. For example, the asymmetrical arrangement of the transducer and the light beam splitting means with respect to the stator reference axis creates problems in the operation of the rotor-stator assembly, due to the differing air currents, pressures, etc., that are created. Also, the optical path between the light source and the lens must preferably be lengthened to decrease the size of the light spot produced by the rotating reflected light beam.

SUMMARY OF THE INVENTION

It is therefore an object of this invention to provide pickoff means of the photodynamic type for spatial orientation responsive devices and the like, wherein the photoelectric transducer means of the pickoff may be mounted within the housing of the spatial orientation responsive device in a symmetrical position with respect to the stator reference axis, and directly in the path of the reflected light from the mirror.

It is a further object of this invention to provide pickoff means of the photodynamic type for spatial orientation responsive devices, and the like, which eliminates the use of any light splitting means, or similar devices.

It is a further object of this invention to provide pickoff means of the photodynamic type for spatial orientation responsive devices and the like, wherein the reflecting surface of the mirror is divided into two or more portions, each extending at a different angle with respect to the incident light beam to insure that upon rotation of the mirror, the reflected light from the mirror passes through each of at least two portions of the light sensitive surface of the transducer, while staying completely within this surface.

Briefly summarized, the photodynamic pickoff means of the present invention includes means for producing an incident light beam directed toward one of the spin axis poles of the rotor member; light beam reflecting means mounted on the rotor member at said one spin axis pole thereof for reflecting the incident light beam to form a reflected light beam which lies at an angle with respect to the rotor spin axis, and photoelectric transducer means fixed with respect to said stator member and symmetrical with respect to the stator reference axis, said transducer means being directly in the path of the reflected light beam and responsive to the position of the line of movement of the closed path produced by the beam for providing an output signal.

BRIEF DESCRIPTION OF THE DRAWINGS

Reference is now made to the accompanying drawings for a better understanding of the nature and objects of the photodynamic pickoff means of the present invention, which drawings illustrate the best mode presently contemplated for carrying out the objects of the invention and its principles, and are not construed as restrictions or limitations on its scope. In the drawings:

FIGS. 2a, 2b, 3a, 3b, 4a, and 4b are diagrammatic views depicting the basic components of the photodynamic pickoff means of the present invention, in different relative positions;

FIG. 7 is a diagrammatic view showing the method of combining the four series of output pulses from the photoelectric transducer used in the pickoff system of the present invention to obtain two pulse duration modulated output signals providing two-axis positional information;

FIG. 8 is a set of representative waveshapes of the pulse duration modulated output signals derived from the pickoff system of the present invention; and FIG. 9 is a circuit diagram of a suitable signal combining circuit which may be employed to derive the two pulse duration modulated output signals of the pickoff from the four outputs of the photoelectric transducer means.

DESCRIPTION OF THE PREFERRED EMBODIMENTS

Figure 1:
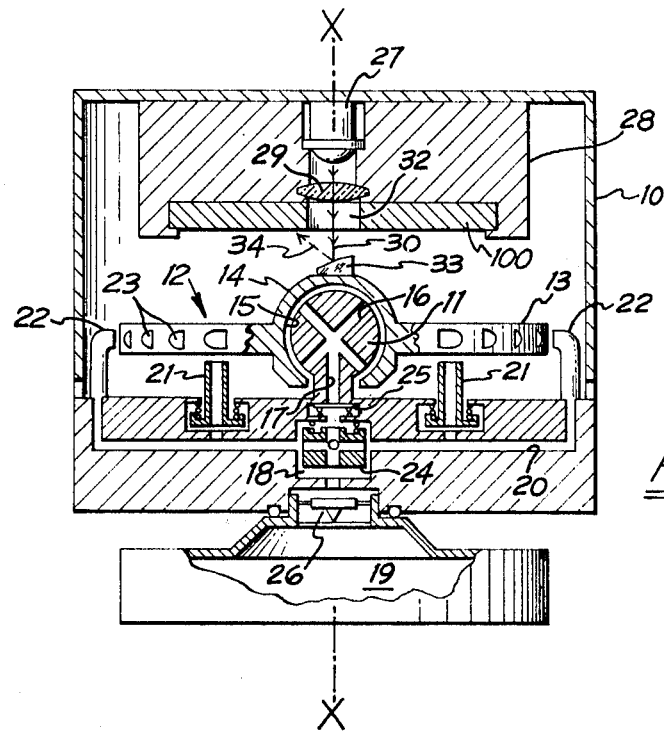
FIG. 1 is a full sectional view of a two-axis, free-rotor gyroscope of the hydrostatic gas bearing type utilizing the photodynamic pickoff means of the present invention.

Referring now to FIG. 1 of the drawings, there is shown a two-axis, free-rotor gyroscope having a hydrostatic gas bearing and employing the photodynamic pickoff means of the present invention. The gyroscope illustrated in FIG. 1 is a two-axis, directional gyroscope of the type disclosed in the aforementioned U.S. Pat. application Ser. No. 687,680, now U.S. Pat. No. 3,501,966 to which reference is made for details of construction and operation. As seen in FIG. 1, the gyroscope comprises a substantially cylindrical housing 10 within which is disposed a substantially spherical stator 11 and a rotor 12. The spherical stator 11 may be integral with the gyroscope housing 10 and has a reference axis X-X which bisects the stator. The rotor 12 of the gyroscope is shaped in the manner of a wheel and has a rim portion 13 which extends radially from a central or "hub" portion 14. A substantially spherical cavity 15 is formed in the hub portion 14 of the rotor, so that the rotor 12 may be mounted on the stator 11 with the spherical stator concentrically disposed within the spherical cavity 15. A plurality of radially extending passageways 16 are formed in the stator 11 and are connected by a centrally disposed passageway 17 to a central inlet port 18. The central inlet port 18 is connected to a gas pressure supply source 19 which may conveniently comprise a tank or "bottle" of pressurized gas, for example. The pressurized gas from the supply source 19 is admitted to the substantially spherical space between the stator 11 and the rotor hub portion 14 by the aforementioned passageways 16 and 17 and the central inlet port 18, so that the rotor member 12 is supported on the stator member 11 by a thin film of gas which forms a hydrostatic gas bearing. A gas bearing of this type is virtually frictionless in operation and not only permits the rotor to be spun about its spin axis, but also permits relative angular movement between the rotor spin axis and the stator reference axis X–X in two, mutually perpendicular planes corresponding to the 2° of freedom of the gyroscope.

The gyroscope shown in FIG. 1 of the drawings is also provided with means for caging the rotor and bringing the rotor up to full operating spin speed. To this end, the central inlet port 18 is connected by a plurality of passageways 20, formed in the gyroscope housing, to a plurality of caging means 21 which are equidistantly spaced around the stator 11. The caging means 21 are essentially pressure-operated pistons and serve to support the rim portion 13 of the rotor 12 during the spinup period, so that the spin axis of the rotor is kept in alignment with the stator reference axis X–X. Passageways 20 also serve to connect the central inlet port 18 to a plurality of jet pipes 22 which are disposed equidistantly around the inner periphery of the housing 10. The jet pipes 22 cooperate with a plurality of turbine bucket grooves 23, formed about the periphery of the rim portion 13 of the rotor, to bring the rotor member up to operating spin speed. A control valve 24 is provided at the central inlet port 18 to "program" or control the starting sequence of the gyroscope, and pressure regulating means 25 are disposed between the inlet port 18 and the central passageway 17 to regulate the gas pressure supplied to the gas bearing. A master starting device in the form of a rupturable diaphragm and pin arrangement 26 is disposed between the gas pressure supply source 19 and the central inlet port 18.

When the gyroscope is mounted in a vehicle, such as a guided missile, for example, the rupturable diaphragm and pin arrangement 26 is activated by the acceleration of the vehicle and functions to connect the gas pressure supply source 19 to the gas bearing arrangement and the caging and rotor spinup mechanisms through the control valve 24. When the caging mechanisms 21 are activated by the gas pressure, they move into position underneath the rim portion 13 of the rotor and serve to bring the rotor spin axis into alignment with the stator reference axis X–X. At the same time, the gas jets from jet pipes 22 impinge upon the turbine bucket grooves 23, formed in the periphery of the rim portion 13 of the rotor, and cause the rotor to spin about the spin axis. Since the gas pressure supply source 19 comprises a tank or "bottle" of pressurized gas, after a period of time the gas pressure from the source will decrease below a predetermined level and the control valve 24 will shut off the gas supplied to the caging mechanisms 21 and the jet pipes 22. This action uncages the rotor and permits it to spin without hindrance at its predetermined operating speed. The control valve 24, however, still permits the remaining gas in the supply source 19 to be supplied to the gas bearing arrangement, while the pressure regulator 25 serves to control the pressure supplied to the gas bearing. At this time, the rotor spin axis is free to deviate from the stator reference axis, so that when the gyroscope is mounted in a vehicle, such as an aircraft or guided missile, for example, the movements of the vehicle about two of its axes, such as the yaw and pitch axes, for example, will cause the rotor spin axis to angularly deviate from the stator reference axis X–X in two, mutually perpendicular planes in which the stator reference axis lies. The angular deviation between the rotor spin axis and the stator reference axis in one plane will be proportional to the pitch of the vehicle, while the angular deviation between the rotor spin axis and the stator reference axis in the other plane will be proportional to the yaw of the vehicle, so that the directional gyroscope illustrated is capable of providing two-axis positional information.

In order to sense the angular deviations between the rotor spin axis and the stator reference axis X–X in the two, mutually perpendicular planes, the photodynamic pickoff system of the present invention is provided for the gyroscope. As shown in FIG. 1 of the drawings, the pickoff system comprises a light source 27 which is mounted on the housing 10 within a cylindrical support member 28 extending from the housing along the stator reference axis X–X. The light source 27 is preferably a solid-state light emitter which provides a source of light in the infrared range of the spectrum and may conveniently comprise, for example, a gallium arsenide infrared emitting diode. It will be understood, however, that the pickoff means of the invention will also operate with a light source which provides light in the visible range of the spectrum. The electric power for the light source 27 may be obtained from any convenient source (not shown), such as a battery, for example, which may be located exteriorly of the gyroscope housing 10.

Since the light source 27 provides the means for operating the pickoff system of the present invention, it is desirable that it not be energized until the rotor 12 is brought up to full operating speed and uncaged, to thereby prevent the generation of spurious output signals by the pickoff. This may be accomplished by any convenient means, such as a pressure responsive switch, for example, which is responsive to the pneumatic pressure used to operate the gyro caging and spinup mechanisms.

The light emitted by the solid-state light emitting diode 27 is directed towards a lens 29, which is also disposed within the support member 28, to form a parallel incident light beam 30 which is coincident with the stator reference axis X–X. A photoelectric transducer 100 is disposed on the support member 28 immediately adjacent the lens 29, and has a central hole 32 formed therethrough through which the incident light beam 30 passes. The photoelectric transducer 100 may cooperate with the cylindrical support member 28 to form a seal between the pressurized interior of the gyroscope housing 10 and the exterior of the housing, so that the electrical leads associated with the transducer do not require the use of pressure seals.

A biplanar mirror 33, having two reflecting surfaces, is mounted on the hub portion 14 of the rotor 12 at one of the spin axis poles thereof, so that each plane of the mirror extends at an acute angle with respect t a line perpendicular to the incident light beam. Therefore, the latter beam is reflected from one surface of the mirror 33 to form a reflected light beam 34 which extends at an acute angle with respect to the rotor spin axis.

In operation, the incident light beam 30 passes from the source 27 through the lens 29, the hole in the transducer 100, and onto one of the reflecting surfaces of the mirror 33. As the rotor spins about its spin axis, the mirror 33 will rotate and will thus cause the reflected light beam 34 to rotate about the spin axis and trace a closed path on the bottom surface of the transducer 100.

The detailed structure and theory of operation of the photodynamic system is shown with references to FIGS. 2a, 2b, 3a, 3b, 4a, and 4b. First of all it should be noted that several requirements are inherent in this type of system. For example, the light source 27 and the lens 29 must combine to produce a sharply defined light beam which has a relatively high intensity so that the photoelectric transducer 100 will produce electric output signals of a correspondingly high level, thereby minimizing the need for substantial amplification of the signals. Also, in these types of gyroscopic applications, the reflecting surface of the mirror must extend at an optimum angle so that the reflected light beam will describe a circle whose diameter is the average of the transducer diameter and its central hole diameter, in order to obtain a large enough scale factor for detection. Furthermore, the entire system must be compactly mounted, and each component must not exceed certain physical dimensions.

Referring to FIGS. 2a and 2b, the mirror 33 has been enlarged in size for convenience of presentation and has a circular reflecting surface made up of a first surface 33a extending at a first acute angle with respect to a line perpendicular to the incident light beam 30, and a second surface 33b extending at a second acute angle with the beam. As an example of the magnitude of these angles, the first angle may be approximately 25° and the second angle, 17°. The purpose of the biangular surface will be explained in detail later.

The rotor 12 is shown in a null position in FIG. 2a, that is without any relative angular displacement between it and the stator 11, and the incident light beam 30 from the source 27 strikes the mirror 33 on the surface 33a, and is reflected into a light beam 34 which strikes the light sensitive bottom surface of the transducer 100 as shown. As the rotor 12, and therefore the mirror 33, rotates, the reflected light beam 34 traces a circle 50 on the bottom surface of the transducer 100, and passing through each of four quadrants A, B, C, D, as shown in FIG. 2b.

Figure 3B:
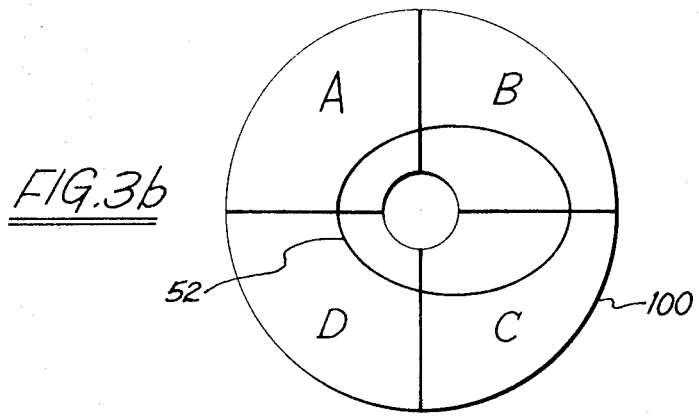
Figure 3A:
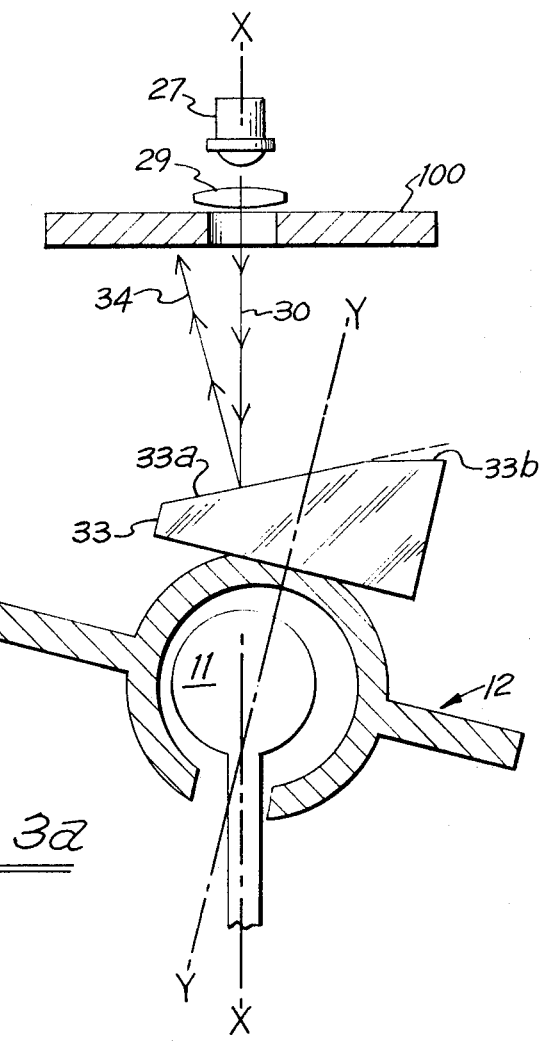

If relative movement occurs between the rotor 12 and the stator 11 in response to pitch and/or yaw of the vehicle such as, for example, movement of the stator with respect to the rotor in a direction to the left as viewed in FIG. 2a, the spin axis Y-Y of the rotor will be angularly displaced in a clockwise direction with respect to the reference axis X-X of the stator 11, as shown in FIG. 3a. This movement causes the incident light beam 30 to strike the surface 33a of the mirror at a different angle than before, and upon rotation of the mirror 33, a ellipse 52 is traced on the light sensitive bottom surface of the transducer 100 as shown in FIG. 3b.

Figure 4B:
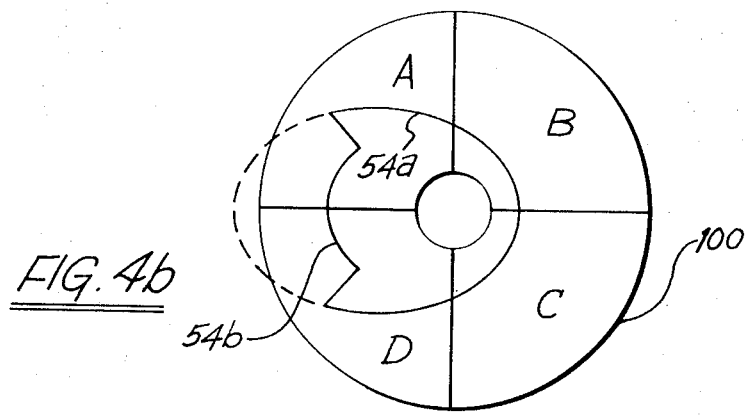
Figure 4A:
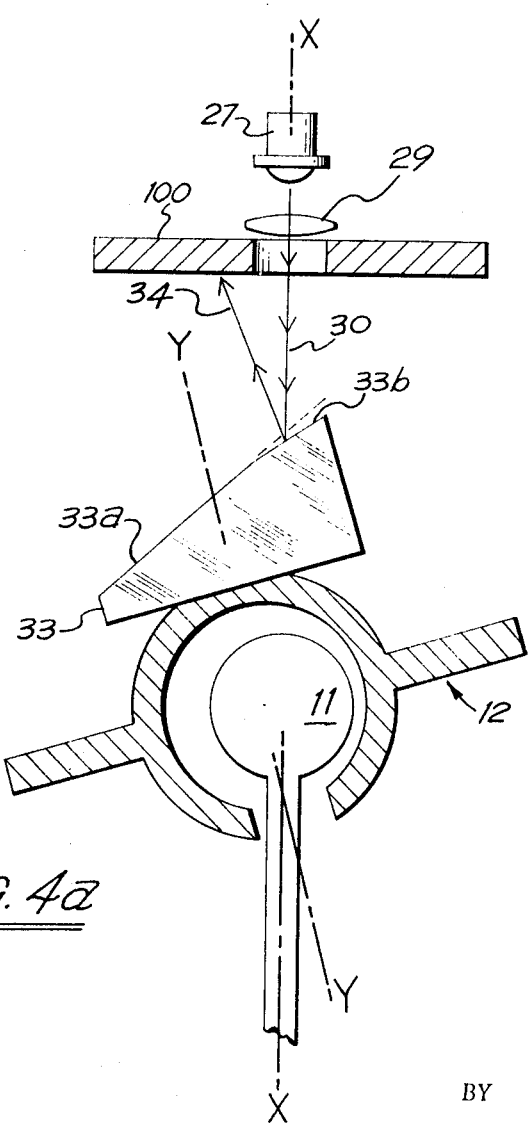

In the event the stator assembly displaces relative to the rotor in a direction to the right as viewed in FIG. 2a, the spin axis Y-Y would be angularly displaced in a counterclockwise direction with respect to the stator reference axis X-X, as shown in FIG. 4a. Corresponding movement and rotation of the mirror 33 would cause an ellipse to be traced on the bottom surface of the transducer 100, as shown in FIG. 4b. However, if the reflecting surface of the mirror were continuous, as shown by the dotted line in FIG. 4a, upon the incident light beam 30 striking the latter portion during rotation of the mirror, the resulting reflected beam would extend off of the surface of the transducer as shown by a portion of the dotted line in FIG. 4b, and the intelligence received in quadrants A and D of the transducer would be incomplete. Therefore, the mirror 33 is provided with the second angular reflecting surface 33b which is of a smaller angle than the surface 33a, and which enables the incident light beam striking this portion of the mirror to be reflected at a smaller angle, so that it will extend onto the bottom surface of the transducer 110, as shown by the line 54b in FIG. 4b.

It is emphasized that the angle the surface 33b makes with respect to a line perpendicular to the stator reference axis in the null position can vary between approximately 3—10° less than the angle formed by the surface 33a, and that the point in which the surfaces 33a and 33b meet is a matter of design depending on the relative size of the components, etc.

It is noted that, since the angular velocity of the light spot transversing the line 54a is the same as the angular velocity of a corresponding line that would be traced by the surface 33a, the amount of time that the reflected light passes in the path 54b is the same as it would be if a continuous surface was used. Therefore no adjustment in the electronics associated with the transducer 100, and as discussed in detail later, is necessary.

It can be appreciated that if the entire surface of the mirror were disposed at the above lower angle, the reflected beam would not trace a path in one or more of the quadrants under certain conditions, which, of course, would be undesirable.

Therefore, the use of the biplanar mirror in the above fashion permits the transducer 100 to be mounted in the symmetrical position shown with respect to the stator reference axis, to be within the size limitations required in such an arrangement, and still receive complete intelligence within the entire range of angular deviations between the rotor and the stator.

Figure 5:
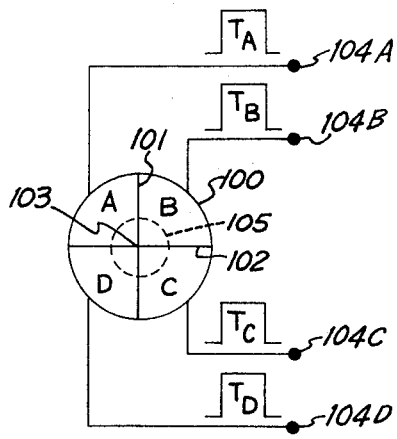
FIG. 5 is a plan view of a four-section photoelectric transducer used in the pickoff system of the present invention showing the closed path traced by the beam of light when the stator reference axis is aligned with the rotor spin axis.

As seen in FIGS. 2—4 and particularly in FIG. 5, of the drawings, and as disclosed in the above mentioned application, the face of the photoelectric transducer 100 is substantially circular and is divided into four coplanar quadrants or sections 100A, 100B, 100C and 100D by a pair of mutually perpendicular dividing lines 101 and 102. The transducer 100 may conveniently comprise a silicon photodetector, for example, which functions essentially as a light responsive resistance wherein the electrical resistance presented by the detector varies as a function of the intensity of the light striking the surface of the detector. When an infrared light emitter is employed as the light source, the photodetector may be selected to have a peak response in the infrared range of the spectrum, to thereby insure an optimum output signal. In a four-section photodetector of this type, a single source of voltage is utilized to energize the detector, but each of the four sections of the detector is provided with a separate output, so that each section of the detector functions independently of the remaining sections. In discussing the orientation of the photodetector 100 with respect to the movements of the light beam 34, it may be noted that, as the rotor spin axis angularly deviates from the stator reference axis in one of the two, mutually perpendicular planes representing the 2° of freedom of the gyroscope rotor, the center of the path traced by the light beam on the face of the photodetector will move along a straight line. Similarly, as the rotor spin axis deviates from the stator reference axis in the other mutually perpendicular plane, the center of the light path will move along a second straight line which is perpendicular to the first line of movement. Accordingly, the photodetector 100 is mounted on the interior of the housing 10 of the gyroscope in such a manner that the two dividing lines 101 and 102 on the face of the detector are coincident with the two lines of movement of the center of the path.

Because of this arrangement, when the rotor spin axis is coincident with the stator reference axis, the two dividing lines 101 and 102 will quadrisect the circular path traced by the light beam. For example, the dividing line 101 on the face of the photodetector 100 may be made coincident with the line of movement traced by the center of the circular light path which is caused by pitch axis deviations sensed by the gyroscope, while the dividing line 102 of the photodetector may be made coincident with the line of movement of the center of the circular light path caused by yaw axis deviations. Under these conditions, and when the vehicle in which the gyroscope is mounted is not subject to any yaw or pitch deviations, the spin axis of the rotor 12 is in alignment with the reference axis X-X of the stator 11 as shown in FIG. 2a, and the center of the path 105 traced by the beam of light is coincident with the point of intersection 103 of the dividing lines 101 and 102. Accordingly, the path 105 traced by the rotation of the reflected light beam 34 will be divided into four equal lengths and the photodetector 100 will sequentially produce four output pulses having the same amplitude and the same pulse width, as shown in FIG. 5. Assuming that a common supply terminal of the photodetector is connected to a positive source of DC voltage, the four output pulses will be produced at output terminals 104a, 104b, 104c, and 104d or the photodetector as illustrated. Since the gyroscope rotor is continually spinning, each of the four sections of the photodetector will produce a series of output pulses having a pulse repetition rate corresponding to the rotor spin speed. The amplitude of these pulses will be constant if the intensity of the light beam is constant. Since the width or time duration of the output pulses produced by each of the four sections of the photodetector 100 is determined by the length of the path transversed by the light beam in that section, when the path is quadrisected by the dividing lines 101 and 102 so that the light path is divided into four equal lengths, the pulse widths of the four output pulses will be of equal magnitude, as illustrated.

Figure 6:
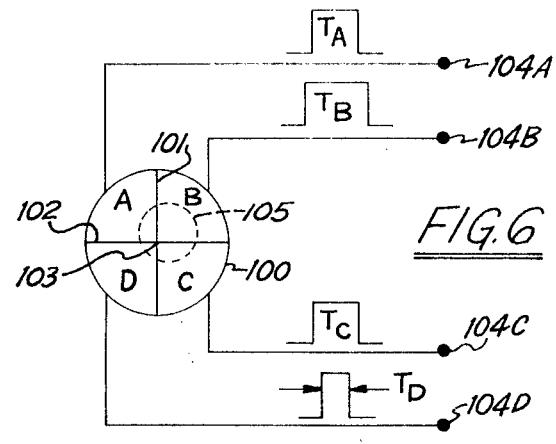
FIG. 6 is a plan view of the four-section photoelectric transducer of FIG. 4, showing the path traced by the beam of light when the stator reference axis is not in alignment with the rotor spin axis.

In order to illustrate the operation of the photodynamic pickoff system of the invention, it will be assumed that the vehicle in which the gyroscope is mounted is subject to both yaw and pitch axis deviations which will cause the spin axis of the rotor 12 to move angularly with respect to the stator reference axis X–X, as shown in either FIGS. 3a or 4a, and the movement is such that the center of the path 105 traced by the light beam will lie within section 100b of the photodetector as shown in FIG. 6 of the drawings. A circular path is shown for simplicity of presentation, it being understood that the paths shown in FIGS. 3b and 4b, or combinations thereof, will actually be traced. Since the path 105 traced by the light beam is no longer divided into four equal segments, the four sequentially occurring output pulses appearing at the terminals 104a through 104d of the photodetector, will no longer be of equal time duration, but will, however, remain at the same amplitude. Under the assumed conditions, the output pulses from section 100b of the photodetector will have a width $T_B$ which is greater than the widths of the pulses from the remaining sections, since the largest portion of the path 105 lies in section 100b of the photodetector. Similarly, in the example illustrated in FIG. 6 of the drawings, the widths $T_A$ and $T_C$ of the respective pulses from sections 100a and 100c of the photodetector will be smaller than the pulse width $T_B$ of the pulses from section 100b. Since the portion of the path 105 which is located in section 100d of the photodetector has the shortest length, the pulse width $T_D$ of the pulses from that section will be the smallest of all the pulses generated by the photodetector. It will be understood that each of the four sections of the photodetector 100 produces a series of the output pulses illustrated for that section and that the pulse repetition rate of the pulses in the series will correspond to the than spin speed.

As thus far described, it is believed apparent that the four series of output pulses of equal amplitude, but variable width, produced by the photodetector 100 will serve to completely define the deviation of the rotor spin axis from the stator reference axis X–X in both of the mutually perpendicular planes which represent the 2° of freedom of the gyroscope. Assuming that the gyroscope and the photodetector 100 are so oriented that movements of the vehicle in which the gyroscope is mounted about the pitch axis of the vehicle will cause the center of the path 105 to move along the dividing line 101 on the face of the photodetector 100, it is seen that the differential between the sum of the pulse widths of the pulses from sections 100a and 100b of the photodetector and the sum of the pulse widths of the pulses from sections 100c and 100d of the photodetector will be related to the pitch axis deviation of the vehicle and will indicate the displacement of the center of the path 105 with respect to the dividing line 102. For example, when the angular displacement of the rotor spin axis from the stator reference axis X–X causes the center of the path 105 to move above the line 102 on the face of the photodetector the sum of the pulse widths $T_A$ and $T_B$ will be greater than the sum of the pulse widths $T_C$ and $T_D$, since the greater portion of the path 105 lies above the line 102. Similarly, when the center of the path 105 moves below the line 102, the sum of the pulse widths $T_C$ and $T_D$ will become greater than the sum of the pulse widths $T_A$ and $T_B$, so that the magnitude and sense of the pulse width differential between the two sets of pulses respectively represent the magnitude and direction of the pitch axis deviations. In a similar manner, the magnitude and sense of the pulse width differential between the sum of the pulse widths of the pulses from sections 100a and 100d of the photodetector and the sum of the pulse widths of the pulses from sections 100b and 100c will respectively represent the magnitude and direction of the deviation of the vehicle about the yaw axis. Accordingly, it is apparent that the relative magnitudes of the four series of pulses produced by the photodetector 100 will completely define any combination of yaw and pitch displacements of the vehicle in which the gyroscope is mounted.

The method of combining the four series of output pulses from the photodetector 100 is schematically illustrated in FIG. 7 of the drawings, wherein the output pulses from sections 100a and 100b of the photodetector 100 are shown as being applied to a summing circuit 106 which functions to provide an output pulse having a width $T_1$ which is equal to the sum of the pulse widths $T_A$ and $T_B$. Similarly, the output pulses from sections 100c and 100d of the photodetector are applied to a summing circuit 107 which functions to produce an output pulse having a width $T_2$ which is equal to the sum of the pulse widths $T_C$ and $T_D$. The output pulses from summing circuits 106 and 107 are applied to a modulation circuit 108 which functions to produce a single series of output pulses 109 which is a pulse duration modulated signal representing the pitch axis deviation sensed by the gyro. The waveshape of the output signal 109 from the modulation circuit 108 is shown in detail in FIG. 8 of the drawings, wherein it is seen that the signal 109 comprises a series of pulses having a width $T_1$ which are separated by time periods $T_2$. Since $T_1$ is the sum of the pulse widths $T_A$ and $T_B$ and $T_2$ is the sum of the pulse widths $T_C$ and $T_D$, it is seen that the waveshape 109 completely defines both the magnitude and sense of the pulse width differential between the two sets of summed pulses and consequently represents both the magnitude and direction of the pitch axis deviations sensed by the gyroscope. The modulation fraction $M_P$ for the pitch axis is given by the expression (1) $$M_P = \frac{T_1 - T_2}{T_1 + T_2}.$$

Referring again to FIG. 7 of the drawings, the output pulses from sections 100a and 100d of the photodetector are applied to a summing circuit 110 which functions to provide an output pulse having a width $T_3$ which is equal to the sum of the pulse widths $T_A$ and $T_D$. The output pulses from sections 100b and 100c of the photodetector are applied to a summing circuit 111 which functions to produce an output pulse having a width $T_4$ which is equal to the sum of the pulse widths $T_B$ and $T_C$. The output pulses from summing circuits 110 and 111, which represent the yaw axis deviation sensed by the gyroscope, are applied to a modulation circuit 112 which functions to produce a series of output pulses 113 which is a pulse duration modulated signal representing the yaw axis deviation. The waveshape of the pulse duration modulated output signal 113 from the modulation circuit 112 is shown in detail in FIG. 8 of the drawings, wherein it is seen that the signal comprises a series of pulses having a width $T_3$ which is equal to the sum of the pulse widths $T_A$ and $T_D$. The time interval $T_4$ between the pulses is equal to the sum of the pulse widths $T_B$ and $T_C$. Accordingly, the ratio of the pulse time on $T_3$ to pulse time off $T_4$ serves to completely define the magnitude and direction of yaw axis deviations sensed by the gyroscope. The modulation fraction $M_y$ for the yaw axis is given by the expression (2) $$M_y = \frac{T_3 - T_4}{T_3 + T_4}.$$

The circuit diagram of a signal combining circuit capable of performing the aforementioned method of combining the output pulses from the photodetector 100 is shown in FIG. 9 of the drawings. As seen in FIG. 9, the common supply terminal 104e of the photodetector 100 is connected to a DC voltage supply source +E by means of a lead 115 and an input resistance 116 to energize the photodetector. A shunt-detector Zener diode 117 and a shunt capacitor 118 are provided across the voltage output from the source +E to regulate and filter the voltage supply. The functions performed by the summing circuits 106 and 107 and the modulation circuit 108 with respect to the pitch axis deviations in FIG. 7 of the drawings are performed by a single flip-flop circuit 119 in the arrangement of FIG. 9 of the drawings. In a similar manner, a second flip-flop circuit 120 in FIG. 9 performs the functions of the summing circuits 110 and 111 and the modulation circuit 112 with respect to the yaw axis deviations. The flip-flop circuits 119 and 120 may conveniently comprise a commercially available flip-flop circuit having dual set inputs and dual reset inputs, such as Motorola type MC302 or MC352A, for example. Essentially, a flip-flop circuit of this type is a logic circuit having a bistable operating characteristic wherein the circuit may be triggered into one stable operating state by energization of either or both of the dual set inputs and triggered into the other stable operating state by energization of either or both of the dual reset inputs. When the set and reset inputs of the flip-flop circuit are successively, alternately activated, the output from the flip-flop circuit will be a series of square waves or pulses having a time duration which is determined by the cyclic triggering of the set and reset inputs. The amplitude of the output pulses from the flip-flop circuit will be constant and will be determined by the magnitude of the voltage supply and the parameters of the circuit. Referring again to FIG. 9 of the drawings, the flip-flop circuit 119 is shown as comprising dual set inputs 121 and 122 which are parallel-connected and dual reset inputs 123 and 124 which are also parallel-connected, so that energization of either of the set inputs will trigger the flip-flop into one stable operating state and energization of either of the reset inputs will trigger the flip-flop into the other stable operating state. The flip-flop 119 is provided with an output 125 at which the pulse duration modulated signal representing the pitch output of the pickoff appears. Flip-flop 119 is connected to the DC supply voltage source +E by means of a lead 126 and the lead 115. The set input 121 of the flip-flop is connected to the output terminal 104A of the photodetector 100 by means of a lead 127 and an input resistance 128, while the set input 122 of the flip-flop is connected to output terminal 104b of the photodetector by means of a lead 129 and an input resistance 130. The reset input 123 of the flip-flop is connected to the output terminal 104d of the photodetector by means of a lead 131 and an input resistance 132, while the reset input 124 is connected to the output terminal 104c of the photodetector by means of leads 133 and 134 and an input resistance 135. In a similar fashion, the flip-flop circuit 120 is provided with dual parallel-connected set inputs 136 and 137 and dual parallel-connected reset inputs 138 and 139. The output 140 of the flip-flop 120 provides a pulse duration modulated signal which represents the yaw axis deviation sensed by the gyroscope. The voltage supply for the flip-flop 120 is obtained from the DC voltage supply source +E by means of a lead 141 and the lead 115, so that both flip-flops and the photodetector 100 are energized by a single DC supply voltage source. In practice, the DC supply voltage may be of the order of magnitude of +28 volts, for example. The set input 136 of flip-flop 120 is connected to the output terminal 104a of the photodetector by means of a lead 142, while the other set input 137 of the flip-flop is connected to the output terminal 104d of the photodetector by means of a lead 143 and the input resistance 132. The reset input 138 of the flip-flop is connected to the output terminal 104b of the photodetector by means of a lead 144 and the input resistance 130, while the other reset input 139 of the flip-flop is connected to the output terminal 104c of the photodetector by means of a lead 134 and the input resistance 135.

By virtue of the foregoing arrangement, the set inputs 121 and 122 of the flip-flop 119 are connected to sections 104a and 104b of the photodetector, so that the flip-flop 119 will be triggered into its first stable operating state by the pulses from these sections and will remain in the first stable operating state during the time that the light beam traverses these sections. Accordingly, the dual parallel-connected set inputs function in the manner of a summing circuit to provide a pulse having a time duration $T_1$ which is equal to the sum of the pulse widths $T_A$ and $T_B$. Since the reset inputs 123 and 124 of flip-flop 119 are similarly connected to sections 100c and 100d of the photodetector, the flip-flop 119 will be triggered to its second stable operating state by the pulses from these sections and will remain in the second operating state for a time duration $T_2$ which is equal to the sum of the pulse widths $T_C$ and $T_D$. Accordingly, the output from flip-flop circuit 119 appearing at output terminal 125 will be a series of pulses having the waveshape 109 as shown in FIG. 7 of the drawings and will be a pulse duration modulated signal representing the pitch axis deviations sensed by the gyroscope In a similar manner, the set inputs 136 and 137 of the flip-flop 120 are connected to sections 104a and 104d of the photodetector and function to cause the flip-flop 120 to generate an output pulse having a time duration $T_3$ which is equal to the sum of the pulse widths $T_A$ and $T_D$ of the pulses from these sections. The flip-flop circuit 120 will be triggered into its second stable operating state by the pulses applied to the reset inputs 138 and 139 which are respectively connected to the sections 100b and 100c of the photodetector, so that no pulse will be produced for a period of time $T_4$ which is equal to the sum of the pulse widths $T_B$ and $T_C$ of the output pulses from these sections. Accordingly, the output signal appearing at output terminal 140 of flip-flop 120 will be a series of pulses having the waveshape 113 shown in FIG. 8 of the drawings and will be a pulse duration modulated signal representing the yaw axis deviations sensed by the gyroscope.

From the foregoing analysis, it is believed apparent that the photodynamic pickoff system of the invention provides two-axis positional information in the form of a pulse duration modulated signals which may be employed directly in instrumentation and control systems of the digital type without the necessity of utilizing any analog-to-digital conversion equipment. For example, the pulse duration modulated pitch and yaw signals from the pickoff system of the invention could be utilized directly to control electromechanical gas valves for thrust vector control of a guided missile. Since the informational content of the pulse duration modulated signals is contained in the ratio of pulse time on to pulse time off, rather than the amplitudes of the pulses, the signals are dependent only upon geometry and are independent of electrical functions and rotor spin speed, so that the pickoff will continue to function with a high degree of accuracy even with "run down" gyros. If desired, the pulse duration modulated pitch and yaw output signals from the pickoff system of the invention may be averaged by means, such as an RC, low pass filter, for example, to derive analog signals which are proportional to the pitch and yaw deviations sensed by the gyroscope. Again, the analog signals will be virtually independent of the rotor spin speed and will enable the pickoff to operate with a high degree of accuracy under conditions of slowly diminishing rotor spin speed. This dual nature of the pulse duration modulated signals from the pickoff system of the invention permits the pickoff system to have great flexibility of use in applications requiring either digital of analog signals. When the pickoff system is employed with gyroscopes or other spatial orientation responsive devices providing only single axis positional information, the photodetector 100 need only comprise two sections and the necessity for pulse width summing means is dispensed with. Since the sensing operations performed by the pickoff system of the invention depend upon the movement of a beam of light, it is obvious that the pickoff system does not impose any undesirable load or drag on the movements of the rotor member of the gyroscope and therefore does not impair the gyroscope accuracy of operation. Accordingly, the pickoff system is especially suited for use with free-rotor gyroscopes of the gas bearing type.

It is also believed apparent that the major component parts of the pickoff system of the invention are susceptible of packaging as a compact unit and may be mounted exteriorly of the pressurized interior of the gyroscope or other spatial orientation responsive device in which the pickoff is employed. Since the only part of the pickoff system of the invention which is mounted on the spinning rotor is the small mirror 33, the pickoff system may be readily used with a wide variety of gyroscopes and other spatial orientation responsive devices. For example, in the hydrostatic gas bearing gyroscope disclosed in U.S. Pat. No. 3,187,588 granted to Bernard Parker on June 8, 1965, wherein the gyroscope comprises a substantially spherical rotor member which is disposed in a substantially spherical cavity formed in the stator member, the small mirror 33 could be mounted on the spherical rotor at one of the spin axis poles thereof and the light source and photodetector could be mounted exteriorly of the pressurized cavity of the stator member. It is apparent that the pickoff system of the invention utilizes a simple, integrated photoelectric transducer mounted symmetrically with respect to the stator reference axis and directly in the path of the reflected light beam, to provide two-axis positional information without any undesirable cross-coupling, and possesses the high accuracy of operation and mechanical ruggedness which are necessary for aircraft and guided missile applications.

It is believed obvious that many changes could be made in the construction and described uses of the foregoing pickoff system and many seemingly different embodiments of the invention could be constructed without departing from the scope thereof. For example, the pickoff system of the invention may be utilized with other types of spatial orientation responsive devices, such as rate gyros, angular accelerometers, and inertial platforms. Also, any type of light sensitive transducer means can be utilized as long as the requirements set forth above are met. Further, the light sensitive surface of the transducer may be divided into any other number of sections, other than four, in accordance with the particular requirements of the system, in which case the associated circuitry would be changed accordingly.

Of course, variations of the specific construction and arrangement of the photodynamic pickoff system disclosed above can be made by those skilled in the art without departing from the invention as defined in the appended claims.

We claim:

1. Photodynamic pickoff means for spatial orientation responsive devices and the like of the type having a stator member, a spinning rotor member, and means for supporting the spinning rotor member to permit relative angular movement between the spin axis of the rotor member and a reference axis of the stator member in at least a first plane in which said axes lie, comprising means mounted on said stator member for producing an incident light beam coaxial with said stator reference axis and directed toward one of the spin axis poles of the rotor member; biplanar mirror means mounted on said rotor member at said one spin axis pole thereof for reflecting said incident light beam to form a reflected light beam which lies at an acute angle with respect to said rotor spin axis, said biplanar mirror means having first and second light reflecting surfaces respectively lying at different acute angles with respect to a line perpendicular to said indent light beam, so that rotation of the rotor member about said spin axis causes said reflected light beam to rotate about said axis and thereby trace a closed path, whereby the line of movement of the center of said closed path represents the angular deviations between said rotor spin axis and said stator reference axis in said first plane; and photoelectric transducer means mounted on said stator member in the path of said reflected light beam and symmetrically disposed about said reference axis, said transducer means being provided with an aperture through which said incident light beam passes and having at least two independently operable portions for actuation by said reflected light beam, which portions are disposed on opposite sides of a dividing line which is perpendicular to the said line of movement of the center of the closed path and which bisects the closed path when the rotor spin axis coincides with the stator reference axis, so that each of said transducer portions produces an output signal in the form of a series of output pulses having a pulse repetition rate corresponding to the rotor spin speed and a pulse width representing the angular deviation between the rotor spin axis and the stator reference axis in said first plane, whereby the magnitude and sense of the differential between the pulse widths of the two series of output pulses respectively represent the magnitude and direction of the angular deviation between the rotor spin axis and the stator reference axis in said first plane.

2. Photodynamic pickoff means as claimed in claim 1, wherein said incident light beam producing means comprises an infrared emitter and said photoelectric transducer means is selected to have a peak output in the infrared range of the spectrum.

3. Photodynamic pickoff means as claimed in claim 1, wherein relative angular movement between the rotor spin axis and the stator reference axis is permitted in a second plane perpendicular to said first plane, the line of intersection of said planes being coincident with the stator reference axis, and wherein said photoelectric transducer means has four independently operable portions defined by the intersection of said first named dividing line with a second dividing line perpendicular thereto, the said first and second dividing lines being arranged to quadrisect the closed path traced by the rotating reflected light beam when the rotor spin axis coincides with the stator reference axis, so that each of the four transducer portions produces a series of output pulses having a repetition rate corresponding to the rotor spin speed and a pulse width representing the angular deviation between the rotor spin axis and the stator reference axis in both of said planes, whereby the relative magnitudes of the pulse widths of the four series of output pulses completely define the angular deviation between the rotor spin axis and the stator reference axis in both of said planes.

4. Photodynamic pickoff means as claimed in claim 3, further comprising first circuit means for summing the pulse widths of the output pulses from the transducer portions disposed on one side of said first dividing line, summing the pulse widths of the output pulses from the transducer portions disposed on the other side of said first dividing line, and producing a first pulse duration modulated output signal representing the magnitude and sense of the differential between the summed pulse widths from the transducer portions disposed on opposite sides of the first dividing line; and second circuit means for summing the pulse widths of the output pulses from the transducer portions disposed on one side of said second dividing line, summing the pulse widths of the output pulses from the transducer portions disposed on the other side of said second dividing line, and producing a second pulse duration modulated output signal representing the magnitude and sense of the differential between the summed pulse widths from the transducer portions disposed on opposite sides of the second dividing line, whereby said first pulse duration modulated output signal represents the magnitude and direction of the angular deviation between the rotor spin axis and the stator reference axis in said first plane and said second pulse duration modulated output signal represents the magnitude and direction of the angular deviation between the rotor spin axis and the stator reference axis in said second plane.

5. Photodynamic pickoff means as claimed in claim 4, wherein each of said first and second circuit means comprises a flip-flop circuit having dual set and reset inputs respectively coupled to the transducer portions disposed on opposite sides of the dividing line associated with that circuit means.

UNITED STATES PATENT OFFICE
CERTIFICATE OF CORRECTION

Patent No. 3,585,877          Dated June 22, 1971

Inventor(s) Jordan Kass/John L. Evans

It is certified that error appears in the above-identified patent and that said Letters Patent are hereby corrected as shown below:

[72] Inventors - correct spelling of "Jordon" to --Jordan--

[73] Assignee: "New York" should be --New Jersey--

Col. 4 - line 53 - After "respect" delete "t" and insert --to--

Col. 4 - line 61 - After "rotor" insert --12--

Col. 7 - line 35 - After "the" delete "than" and insert --rotor--

Col. 8 - line 55 - Equation (2) - "My" should be --$M_Y$--

Col. 8 - line 63, delete "shunt-detector" and insert --shunt-connected

Col. 10, line 3, after "gyroscope" insert a period (.)

Col. 10, line 48, delete "of" and insert --or--

Signed and sealed this 11th day of January 1972.

(SEAL)
Attest:

EDWARD M. FLETCHER, JR.      ROBERT GOTTSCHALK
Attesting Officer               Acting Commissioner of Patents